United States Patent
Chakrabarti et al.

(10) Patent No.: US 8,301,623 B2
(45) Date of Patent: Oct. 30, 2012

(54) PROBABILISTIC RECOMMENDATION SYSTEM

(75) Inventors: Kushal Chakrabarti, Kirkland, WA (US); Brent Smith, Redmond, WA (US)

(73) Assignee: Amazon Technologies, Inc., Reno, NV (US)

( * ) Notice: Subject to any disclaimer, the term of this patent is extended or adjusted under 35 U.S.C. 154(b) by 712 days.

(21) Appl. No.: 11/752,251

(22) Filed: May 22, 2007

(65) Prior Publication Data

US 2008/0294617 A1    Nov. 27, 2008

(51) Int. Cl.
G06F 7/00 (2006.01)
G06F 17/30 (2006.01)

(52) U.S. Cl. ......... 707/723; 707/722; 707/736; 707/748
(58) Field of Classification Search .................. None
See application file for complete search history.

(56) References Cited

U.S. PATENT DOCUMENTS

| | | |
|---|---|---|
| 4,870,579 A | 9/1989 | Hey |
| 4,992,940 A | 2/1991 | Dworkin |
| 4,996,642 A | 2/1991 | Hey |
| 5,235,509 A | 8/1993 | Mueller et al. |
| 5,446,891 A | 8/1995 | Kaplan et al. |
| 5,459,306 A | 10/1995 | Stein et al. |
| 5,583,763 A | 12/1996 | Atcheson et al. |
| 5,704,017 A | 12/1997 | Heckerman et al. |
| 5,724,567 A | 3/1998 | Rose et al. |
| 5,732,398 A | 3/1998 | Tagawa |
| 5,734,885 A | 3/1998 | Agrawal et al. |
| 5,745,681 A | 4/1998 | Levine et al. |
| 5,749,081 A | 5/1998 | Whiteis |
| 5,758,257 A | 5/1998 | Herz et al. |
| 5,758,333 A | 5/1998 | Bauer et al. |
| 5,774,123 A | 6/1998 | Matson |
| 5,774,670 A | 6/1998 | Montulli |
| 5,790,426 A | 8/1998 | Robinson |
| 5,790,935 A | 8/1998 | Payton |
| 5,794,209 A | 8/1998 | Agrawal et al. |
| 5,794,210 A | 8/1998 | Goldhaber et al. |
| 5,825,651 A | 10/1998 | Gupta et al. |
| 5,842,200 A | 11/1998 | Agrawal et al. |
| 5,848,396 A | 12/1998 | Gerace |

(Continued)

FOREIGN PATENT DOCUMENTS

EP    0 265 083 A    4/1988

(Continued)

OTHER PUBLICATIONS

U.S. Appl. No. 10/286,430, filed Oct. 30, 2002.

(Continued)

*Primary Examiner* — Jau-Shya Meng
(74) *Attorney, Agent, or Firm* — Knobbe Martens Olson & Bear LLP

(57) ABSTRACT

A recommendations system uses probabilistic methods to select, from a candidate set of items, a set of items to recommend to a target user. The methods can effectively introduce noise into the recommendations process, causing the recommendations presented to the target user to vary in a controlled manner from one visit to the next. The methods may increase the likelihood that at least some of the items recommended over a sequence of visits will be useful to the target user. Some embodiments of the methods are stateless such that the system need not keep track of which items have been recommended to which users.

28 Claims, 7 Drawing Sheets

U.S. PATENT DOCUMENTS

| | | | |
|---|---|---|---|
| 5,867,799 | A | 2/1999 | Lang et al. |
| 5,870,559 | A | 2/1999 | Leshem et al. |
| 5,872,850 | A | 2/1999 | Klein et al. |
| 5,884,282 | A | 3/1999 | Robinson |
| 5,905,973 | A | 5/1999 | Yonezawa et al. |
| 5,909,023 | A | 6/1999 | Ono et al. |
| 5,909,492 | A | 6/1999 | Payne et al. |
| 5,918,014 | A | 6/1999 | Robinson |
| 5,920,855 | A | 7/1999 | Aggarwal et al. |
| 5,958,008 | A | 9/1999 | Pogrebisky et al. |
| 5,974,396 | A | 10/1999 | Anderson et al. |
| 6,003,029 | A | 12/1999 | Agrawal et al. |
| 6,006,218 | A | 12/1999 | Breese et al. |
| 6,012,051 | A | 1/2000 | Sammon et al. |
| 6,014,638 | A | 1/2000 | Burge et al. |
| 6,016,475 | A | 1/2000 | Miller et al. |
| 6,018,738 | A | 1/2000 | Breese et al. |
| 6,029,139 | A | 2/2000 | Cunningham et al. |
| 6,029,182 | A | 2/2000 | Nehab et al. |
| 6,029,195 | A | 2/2000 | Herz |
| 6,041,311 | A | 3/2000 | Chislenko et al. |
| 6,049,777 | A | 4/2000 | Sheena et al. |
| 6,055,513 | A | 4/2000 | Katz et al. |
| 6,064,980 | A | 5/2000 | Jacobi et al. |
| 6,078,740 | A | 6/2000 | DeTreville |
| 6,084,528 | A | 7/2000 | Beach et al. |
| 6,085,229 | A | 7/2000 | Newman et al. |
| 6,092,049 | A | 7/2000 | Chislenko et al. |
| 6,108,493 | A | 8/2000 | Miller et al. |
| 6,112,186 | A | 8/2000 | Bergh et al. |
| 6,144,964 | A | 11/2000 | Breese et al. |
| 6,195,657 | B1 | 2/2001 | Rucker et al. |
| 6,202,058 | B1 | 3/2001 | Rose et al. |
| 6,230,153 | B1 | 5/2001 | Howard et al. |
| 6,256,633 | B1 | 7/2001 | Dharap |
| 6,266,649 | B1 | 7/2001 | Linden et al. |
| 6,317,722 | B1 | 11/2001 | Jacobi et al. |
| 6,321,221 | B1 | 11/2001 | Bieganski |
| 6,330,592 | B1 | 12/2001 | Makuch et al. |
| 6,334,127 | B1 | 12/2001 | Bieganski et al. |
| 6,356,879 | B2 | 3/2002 | Aggarwal et al. |
| 6,438,579 | B1 | 8/2002 | Hosken |
| 6,460,036 | B1 | 10/2002 | Herz |
| 6,466,970 | B1 | 10/2002 | Lee et al. |
| 6,473,794 | B1 | 10/2002 | Guheen et al. |
| 6,484,149 | B1 | 11/2002 | Jammes et al. |
| 6,493,702 | B1 | 12/2002 | Adar et al. |
| 6,507,872 | B1 | 1/2003 | Geshwind |
| 6,587,127 | B1 | 7/2003 | Leeke et al. |
| 6,606,102 | B1 | 8/2003 | Odom |
| 6,636,836 | B1 | 10/2003 | Pyo |
| 6,654,725 | B1 | 11/2003 | Langheinrich et al. |
| 6,658,568 | B1 | 12/2003 | Ginter et al. |
| 6,667,751 | B1 | 12/2003 | Wynn et al. |
| 6,691,163 | B1 | 2/2004 | Tufts |
| 6,735,572 | B2 | 5/2004 | Landesmann |
| 6,782,370 | B1 | 8/2004 | Stack |
| 6,873,967 | B1 | 3/2005 | Kalagnanam et al. |
| 6,901,378 | B1 | 5/2005 | Linker et al. |
| 6,996,572 | B1 | 2/2006 | Chakrabarti et al. |
| 7,016,864 | B1 | 3/2006 | Notz et al. |
| 7,031,961 | B2 | 4/2006 | Pitkow et al. |
| 7,089,237 | B2 | 8/2006 | Turnbull et al. |
| 7,155,401 | B1 | 12/2006 | Cragun et al. |
| 7,295,995 | B1 | 11/2007 | York et al. |
| 7,542,951 | B1 | 6/2009 | Chakrabarti et al. |
| 7,720,723 | B2 | 5/2010 | Dicker et al. |
| 2001/0011235 | A1 | 8/2001 | Kim et al. |
| 2001/0013009 | A1 | 8/2001 | Greening et al. |
| 2001/0014868 | A1 | 8/2001 | Herz et al. |
| 2002/0019763 | A1 | 2/2002 | Linden et al. |
| 2002/0046099 | A1 | 4/2002 | Frengut et al. |
| 2002/0062247 | A1 | 5/2002 | Allen |
| 2002/0082923 | A1 | 6/2002 | Merriman et al. |
| 2002/0184139 | A1 | 12/2002 | Chickering et al. |
| 2002/0198882 | A1 | 12/2002 | Linden et al. |
| 2003/0004781 | A1 | 1/2003 | Mallon et al. |
| 2003/0074252 | A1 | 4/2003 | Chandler-Pepelnjak et al. |
| 2003/0101451 | A1* | 5/2003 | Bentolila et al. ............... 725/34 |
| 2003/0105682 | A1 | 6/2003 | Dicker et al. |
| 2003/0229531 | A1 | 12/2003 | Heckerman et al. |
| 2003/0229537 | A1 | 12/2003 | Dunning et al. |
| 2004/0054572 | A1 | 3/2004 | Oldale et al. |
| 2004/0172267 | A1 | 9/2004 | Patel et al. |
| 2004/0199419 | A1* | 10/2004 | Kim et al. ...................... 705/14 |
| 2005/0038717 | A1 | 2/2005 | McQueen, III et al. |
| 2005/0065811 | A1 | 3/2005 | Chu et al. |
| 2005/0091245 | A1* | 4/2005 | Chickering et al. ........... 707/100 |
| 2006/0184357 | A1* | 8/2006 | Ramsey et al. .................. 704/9 |
| 2006/0206516 | A1* | 9/2006 | Mason ........................ 707/102 |
| 2007/0150473 | A1* | 6/2007 | Li et al. ............................ 707/7 |
| 2007/0156621 | A1 | 7/2007 | Wright et al. |
| 2007/0156887 | A1 | 7/2007 | Wright et al. |
| 2007/0198337 | A1* | 8/2007 | Coon ............................. 705/14 |
| 2007/0271146 | A1* | 11/2007 | Nordmark et al. .............. 705/26 |
| 2008/0086444 | A1* | 4/2008 | Yu et al. ........................... 707/2 |
| 2010/0050201 | A1 | 2/2010 | Kubota et al. |

FOREIGN PATENT DOCUMENTS

| | | |
|---|---|---|
| EP | 0 751 471 A | 1/1997 |
| EP | 0 827 063 A | 3/1998 |
| GB | 2 336 925 A | 3/1999 |
| WO | WO 95/29451 A1 | 11/1995 |
| WO | 9941694 A1 | 8/1999 |
| WO | WO 99/41694 A1 | 8/1999 |
| WO | WO 99/59283 | 11/1999 |
| WO | WO 00/17792 A1 | 3/2000 |
| WO | WO 03/079263 | 9/2003 |
| WO | WO 2004/097665 | 11/2004 |

OTHER PUBLICATIONS

U.S. Appl. No. 10/393,505, filed Mar. 19, 2003.

Terveen, L. et al., Phoaks: A System for sharing Recommendations, Communications of the ACM, Mar. 1997, vol. 40, Issue 3, pp. 59-62.

Anderson, C., et al., Personalizing Web Sites for Mobile Users, AMC press, The Tenth International World Wide Web Conference, 2001, pp. 565-575.

Anderson, J., et al., Analyzing Clickstreams Using Subsessions, Proceedings of the Third ACM International Workshop on Data Warehousing and OLAP, 2000, pp. 25-32.

Balabanovic, M., and Y. Shoham, Content-Based, Collaborative Recommendation, Communications of the ACM, Mar. 1997, vol. 40, Issue 3, pp. 66-72.

Borchers, A., et al., Ganging Up on Information Overload, Computer, Apr. 1998, pp. 106-108.

Building Customer Loyalty and High-Yield Relationships Through GroupLens Collaborative Filtering, Net Perceptions, Inc., Nov. 22, 1996, pp. 9 pages.

CDNow Rated Top Music Site by eMarketer, the Authority on Business Online, Sep. 1998.

Cosmocom, Computer Telephony, Jul. 1998, pp. 124.

Kautz, H. et al., Combining Social Networks and Collaborative Filtering, Communications of the ACM, Mar. 1997, vol. 40, Issue 3, pp. 63-65.

Kohavi, R., Mining E-Commerce Data: The Good, the Bad, and the Ugly, Proceedings of the Seventh ACM SIGKDD International Conference on Knowledge Discovery and Data Mining, 2001, pp. 8-13.

Konstan, J., et al., GroupLens: Applying Collaborative Filtering to Usenet News, Communications of the ACM, Mar. 1997, vol. 30, Issue 3, pp. 77-87.

Langheinrich, M., et al., Unintrusive Customization Techniques for Web Advertising, Computer Networks, also available at http://www8.org/w8-papers/2b-customizing/unintrusive/unintrusive.html, May 1999, vol. 31, Issue 11-16, pp. 1259-1272.

Middleton, S., et al., Capturing Knowledge of User Preferences: Ontologies in Recommender Systems, Proceedings of the International Conference on Knowledge Capture, ACM Press, 2001, pp. 100-107.

Mobasher, B., et al., Automatic Personalization Based on Web Usage Mining, Communications of the ACM, 2000, vol. 43, Issue 8, pp. 142-151.

Maltz, D. et al., Pointing the Way: Active Collaborative Filtering, CHI '95 Proceedings Papers, pp. 11.

Avery, C. et al., Recommender Systems for Evaluating Computer Messages, Mar. 1997, vol. 40, Issue 3, pp. 88-89.

Rossi, G., et al., Designing Personalized Web Applications, ACM Press, The Tenth International World Wide Web Conference, 2001, pp. 275-284.

Rucker, J., et al., Siteseer: Personalized Navigation for the Web, Communications of the ACM, Mar. 1997, vol. 40, Issue 3, pp. 73-76.

Schwab, P., and Koychev, Learning to Recommend from Positive Evidence, ACM Press, Proceedings of the International Conference on Intelligent User Interfaces, 2000, pp. 241-247, New Orleans, Louisiana, U.S.

Widyantoro, D., et al., An Adaptive Algorithm for Learning Changes in User Interests, Proceedings of the Eighth International Conference on Information Knowledge Management, ACM Press, 1999, pp. 405-412.

Yu, K., Selecting Relevant Instances for Efficient and Accurate Collaborative Filtering, Proceedings of the Tenth International Conference on Information and Knowledge Management, ACM Press, 2001, pp. 239-246.

Delgado, J., Intelligent Collaborative Information Retrieval, 1998.

Miller, B.N., et al., Experiences with GroupLens: Making Usenet Useful Again, Department of Computer Science, University of Minnesota, pp. 13, 1996.

Shardanand, Upendra, and Pattie Maes, Social Information Filtering: Algorithms for Automating "Word of Mouth", MIT Media-Lab, undated, pp. 8, 1995.

Resnick, P. et al., GroupLens: An Open Architecture for Collaborative Filtering of Netnews, 18 pages, 1994.

Extended European Search Report issued in application No. 08755598.3 on May 2, 2012 in 8 pages.

* cited by examiner

PROBABILISTIC RECOMMENDATION SYSTEM

BACKGROUND

1. Technical Field

The present disclosure relates to computer processes and systems for generating personalized item recommendations.

2. Description of the Related Art

Web sites and other types of interactive systems commonly include recommendation systems for providing personalized recommendations of items stored or represented in a data repository. The recommendations are typically generated based on monitored user activities or behaviors, such as item purchases, item viewing events, item rentals, and/or other types of item selection actions. In some systems, the recommendations are additionally or alternatively based on users' explicit ratings of items.

Traditional collaborative recommendations processes operate by attempting to match users to other users having similar behaviors or interests. For example, once Users A and B have been matched, items favorably sampled by User A but not yet sampled by User B may be recommended to User B. In contrast, content-based recommendation systems seek to identify items having content (e.g., text) that is similar to the content of items selected by the target user.

Other recommendation systems use item-to-item similarity mappings to generate the personalized recommendations. The item-to-item mappings may be generated periodically based on computer-detected correlations between the item purchases, item viewing events, or other types of item selection actions of a population of users. Once generated, a dataset of item-to-item mappings may be used to identify and recommend items similar to those already "known" to be of interest to the target user.

Of course, these and other recommendations methods can be used in combination within a given system.

SUMMARY OF THE DISCLOSURE

A significant deficiency in existing recommendation systems, including but not limited to recommendation systems of the types described above, is that they ordinarily seek to recommend the "best" (most highly ranked) items to the exclusion of other items representing good recommendation candidates. As a result, the personalized recommendations provided to a given target user tend to be the same each time the user accesses the recommendations. This is especially true if (1) the target user frequently views his or her recommendations, or (2) the target user rarely performs actions that reveal his or her item interests. Thus, currently available recommendation algorithms may provide stale recommendations or recommendations that fail to capture certain interests of the user.

These and other deficiencies are addressed in some embodiments by using probabilistic selection or scoring methods to select specific items to recommend to users. These methods effectively introduce noise into the recommendations process, causing the recommendations presented to the target user to vary in a controlled manner between recommendation access events. Using these methods significantly increases the likelihood that at least some of the items recommended over a sequence of visits will be useful to the target user. This is especially true if the user accesses his or her recommendations relatively frequently (e.g., multiple times per week.) Because the methods are preferably stateless (meaning that the system need not keep track of which items have been recommended to which users), they can advantageously be implemented very efficiently, without placing a large storage burden on the system.

The disclosed processes may be implemented via computer in conjunction with any of a variety of types of recommendation systems, including but not limited to systems that use traditional collaborative recommendations methods, content-based recommendation methods, methods that use item-to-item similarity mappings, or some combination thereof.

Neither this summary nor the following detailed description purports to define the invention. The invention is defined by the claims.

BRIEF DESCRIPTION OF THE DRAWINGS

Specific embodiments will now be described with reference to the drawings, which are intended to illustrate and not limit the various features of the invention.

DETAILED DESCRIPTION OF SPECIFIC EMBODIMENTS

Several different computer-implemented processes will now be described for using probability models to improve item recommendations provided to users. These processes may be embodied individually or in any combination in a multi-user computer system ("system") that implements a recommendation system. For purposes of illustration, the processes are described primarily in the context of a recommendation system that uses item-to-item similarity mappings. As will be recognized, however, the processes may also be used with other types or recommendation systems, including but not limited to traditional collaborative recommendation systems, content-based recommendation systems, and hybrid systems that combine multiple classes of recommendation algorithms.

For purposes of illustration, the processes are described primarily in the context of a system that recommends catalog items to users of an e-commerce web site. As will be apparent, however, the disclosed processes can also be used to recommend other types of items, such as but not limited to web sites, news articles, blogs, travel destinations, service providers, other users, and events. In addition, the disclosed processes need not be implemented as part of, or in conjunction with, a web site.

As mentioned above, currently available recommendation services provide a set of theoretically best recommendations to a user. This set of recommendations often remains unchanged each time the user views his or her list of recommendations. Thus, the user often fails to discover the numerous items identified by the system as merely good, but not ideal, recommendation candidates. As a result, the probability that the user will actually discover items of interest is less than optimal. Moreover, the stale nature of the recommendations may lead to infrequent visits to, or even discontinued use of, the recommendation system.

One option for attempting to solve these problems is to keep track of the items that have been recommended to each user during a given time interval, such as one day. On subsequent visits during this time interval, these items could be filtered out of the recommendation set, causing lower-ranked items to be displayed. Unfortunately, such a method can place a very high storage and processing burden on the system, especially if the user population is large (e.g., tens of millions of users).

Figure 1:
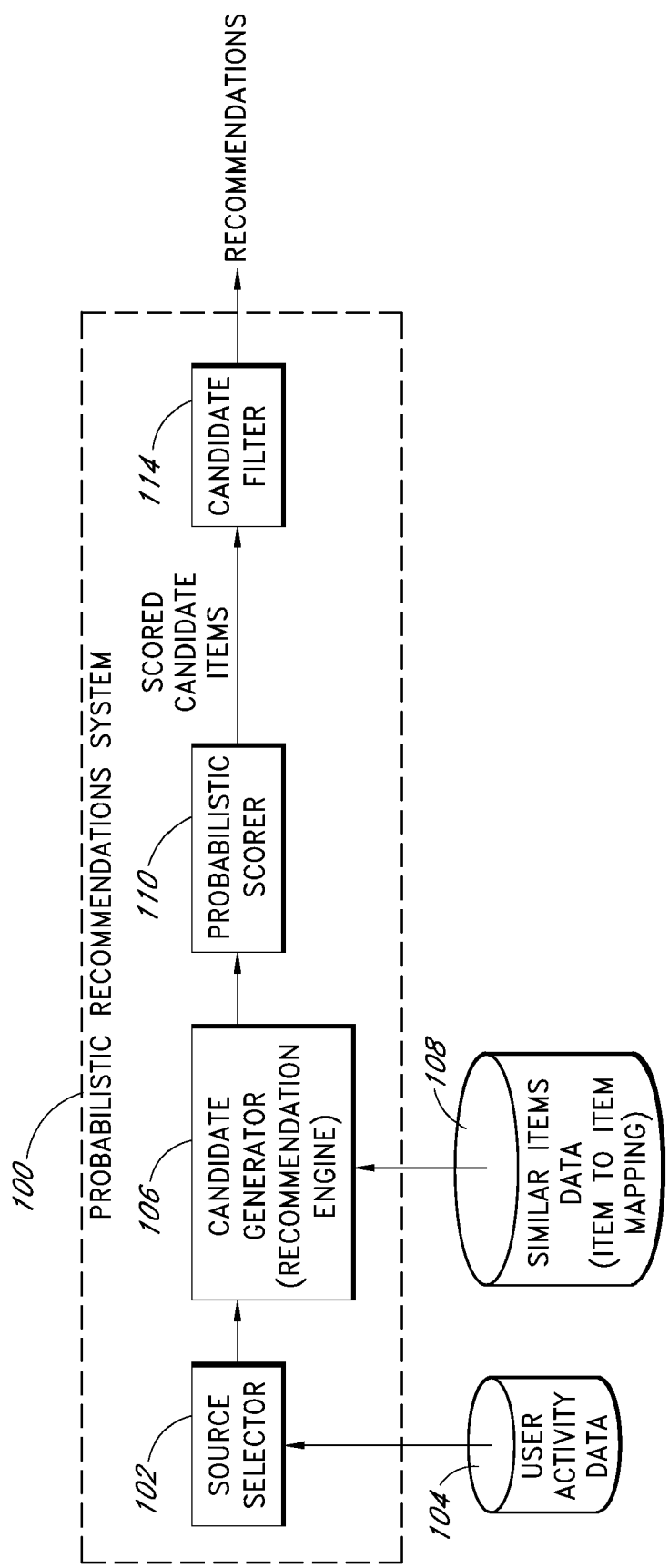
FIG. 1 illustrates an embodiment of a probabilistic recommendation system.

Turning to FIG. 1, an embodiment of a probabilistic recommendation service or system 100 is shown that addresses the foregoing problems, among others. For example, the various components of the probabilistic recommendation system 100 facilitate generating varied recommendation lists.

In one embodiment, the process of generating the recommendations is controlled such that the list of recommendations seen by a given user will remain substantially static (unchanged) within a certain time interval, such as one day, one browsing session or one hour, but will otherwise be varied. Thus, for example, if a user accesses or otherwise initiates the generation of recommendations multiple times within such a time interval, the recommendations may remain unchanged. As discussed below, this may be accomplished by seeding the recommendations process the same way during different recommendation generation events, such that the same recommendations can be reproduced without having to cache the recommendation lists for extended periods of time.

The probabilistic recommendation system 100 of various embodiments includes a source selector 102, a candidate generator 106, a probabilistic scorer 110, and a candidate filter 114, each of which may be implemented as a respective software component. The candidate generator 106 in this embodiment is a recommendations engine that uses item-to-item similarity mappings 108 to select items to recommend. The item-to-item similarity mappings may be based on observed behavioral correlations (e.g., purchase-based or view-based correlations) as is known in the art, and may include similarity scores representing degrees to which specific pairs of items are related.

In other embodiments, the candidate generator 106 may use another type of recommendations method to select the candidate items, such as a traditional collaborative recommendations method and/or content-based recommendations method. Regardless of the type of recommendations method/engine used as the candidate generator 106, one or more of the components 102, 110, and 114 in certain embodiments are responsible for probabilistically selecting and/or re-ranking the candidate items for presentation to the user.

Where item-to-item similarity mappings are used as shown, the candidate generator 106 operates generally by receiving a set of input or "source" items associated with the target user (optionally together with corresponding item weights), and outputting a ranked set of candidate items that are collectively similar to the set of source items. As part of this process, according to some embodiments, the candidate selector can score each candidate item based on both (a) whether it is similar to more than one of the source items, and (b) the degree to which it is similar to each such source item. Specific examples of methods that may be used by the candidate generator to select the candidate items, and to generate the item-to-item similarity mappings, are described in U.S. Pat. No. 6,853,982, the disclosure of which is incorporated by reference in its entirety.

The source selector 102 is responsible for selecting a set of source items to be used to generate personalized recommendations. In the context of an electronic catalog system in which the items are products, the source selector may select these items from, for example, the target user's purchase history, rental history, item viewing history, item ratings profile, wish list, rental queue, shopping cart, tagged items, or any other item collection(s) representing the target users interests or preferences. In the context of a news site in which the items are news articles, the source selector 102 may, for example, select the source items from a collection of items (articles) the user has viewed, forwarded, rated, and/or commented on. Thus, as depicted in FIG. 1, the source selector 102 uses one or more types of recorded user activity data 104 associated with the target user (also referred to as the target user's "event history") to select items likely representing the preferences or interests of the target user. As described below, appropriate sampling methods may be used for this purpose to limit the size of the set of source items, and to thereby limit the processing burden placed on the candidate generator/recommendations engine 106.

The source selector 102 preferably uses probabilistic sampling to select the source items, such that the set of source items used for a given user varies between new recommendation generation events. For example, the source selector may define a probability distribution over the items in the user activity data 104, or collection, and sample these items according to the distribution. Probabilistically sampling items in one embodiment beneficially adds probabilistic "noise" to the set of items, which provides robustness against model errors. Since statistical models are generally not perfect, sampling differently for different visits increases the odds of at least one successful recommendation over multiple visits. Examples of sampling methods are described in more detail below with respect to FIG. 3. Although probabilistic sampling is used in some embodiments, it is not essential. Further, the source selector may be omitted in some embodiments. In such a case, for example, the candidate generator 106 may select the candidates based on an entire item collection (e.g., purchase history) of the target user.

In one embodiment, the source selector 102 generates the set of source items by taking samples from multiple different categories of items in the target user's overall collection or event history. For instance, the source selector may sample from any two or more of the following categories: (a) items purchased or rented by the user, (b) items recently viewed by the user, (c) items rated positively by the user, (d) items rated poorly by the user, (e) items on the user's wish list, (f) items in the user's rental queue, (g) un-purchased items added to the user's shopping cart or wish list, and (h) items tagged by the target user. The foregoing are merely examples, and numerous other categories are possible. The source selector 102 may also optionally use item clustering methods to select the source items, as described in U.S. patent application Ser. No. 11/694,707, filed Mar. 30, 2007, titled "Cluster-Based Assessment of User Interests," the disclosure of which is hereby incorporated by reference in its entirety.

The source selector 102 provides the selected sources to the candidate generator 106. As described above, the candidate generator 106 in this embodiment uses the database of similar items data 108 to generate a ranked set of candidate items. The candidate generator 106 may also output, for each candidate item, a candidate score generally representing the predicted likelihood that the target user will be interested in that item. In some implementations, the candidate score may be the same as the similarity score.

Where the source items are selected from multiple item categories as described above, the candidate generator 106 may optionally use different recommendation algorithms for different categories of items. As one example, the candidate generator may use purchase-based item-to-item similarity mappings to select candidate items that are similar to those in the user's purchase history and may use viewing-based item-to-item similarity mappings to select candidate items similar to items the user recently viewed. The item-to-item similarity mappings, including the associated similarity scores, may be stored in one or more tables.

The candidate generator 106 passes a list of the identified candidate items to the probabilistic scorer 110, which assigns adjusted scores to the candidate items. In one embodiment, the probabilistic scorer 110 thereby re-ranks the candidate items, since the candidate items already have candidate scores. The probabilistic scorer 110 may provide both probabilistic and non-probabilistic (e.g., deterministic) adjusted scores.

The probabilistic scorer 110 in one embodiment scores items probabilistically by defining a probability distribution for at least some of the candidate items, and by sampling a value from each probability distribution. This value is then used to generate an adjusted score for the candidate item, or alternatively, the value is determined to be the adjusted score for that item. In one embodiment, by adding probabilistic scores, the probabilistic scorer 110 also adds probabilistic "noise" to the set of candidate items. Like the probabilistic noise described above with respect to probabilistic sampling, probabilistic noise added to candidate scores provides a more robust recommendation model. In one embodiment, this noise causes the candidate items to be re-ranked, as the adjusted scores are assigned differently than the candidate scores. In effect, the adjusted scores may be made theoretically worse than the theoretically best candidate scores. Paradoxically, recommendations based on these adjusted scores may be more valuable to users who frequently check their recommendations list, as the recommendations are varied according to the probability distribution.

The probabilistic scorer 110 passes the score-adjusted candidate items to the candidate filter 114. The candidate filter 114 selects a subset of the score-adjusted candidate items to recommend to the user based on the items' adjusted scores. For example, the candidate filter 114 may select the N most highly scored items to recommend. Alternatively, the subset may be selected probabilistically as above, based on a probabilistic distribution. In one such embodiment, the distribution depends on the adjusted scores, such that items with higher adjusted scores are more likely to be selected than items with lower adjusted scores.

Figure 2:
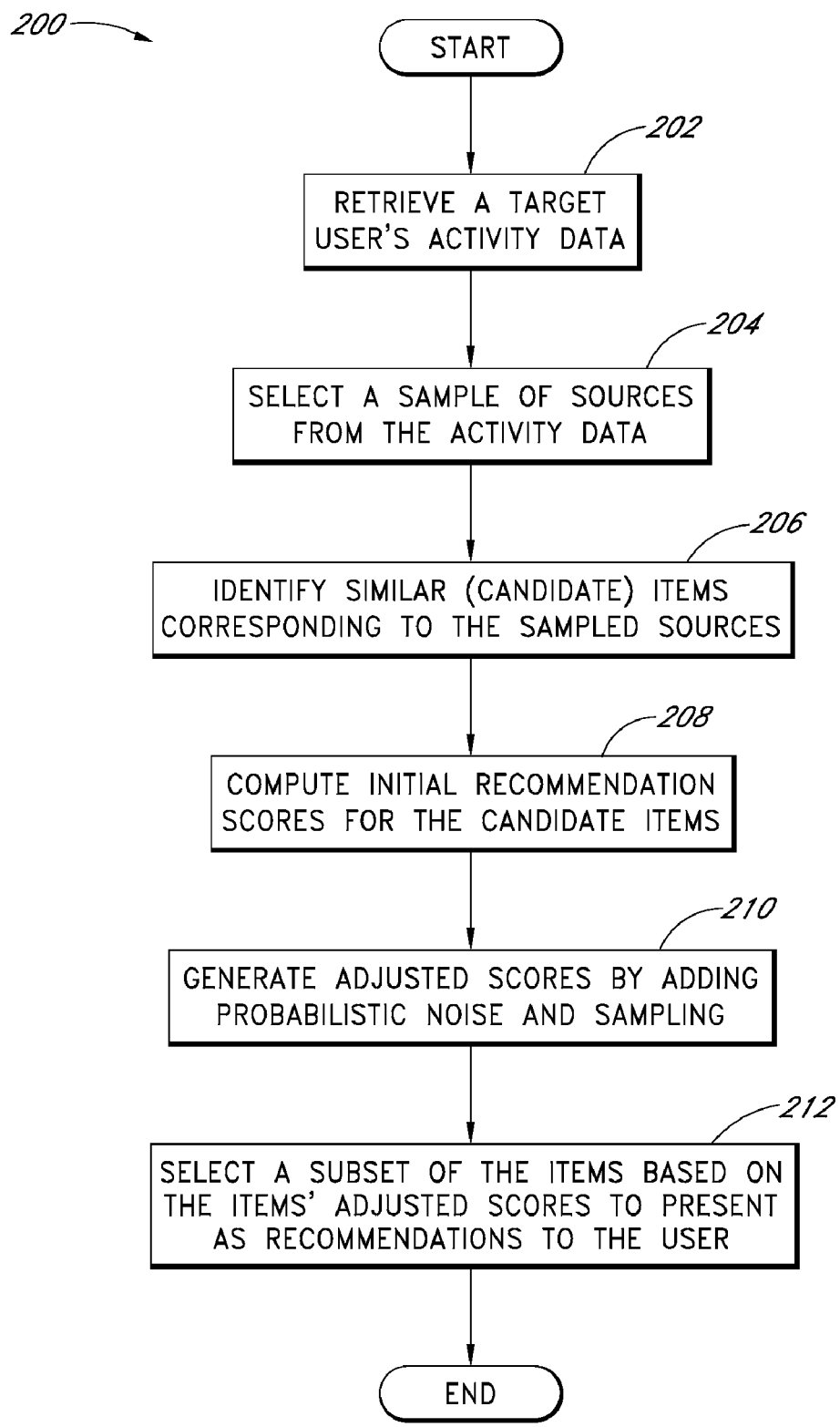
FIG. 2 illustrates an embodiment of a process for generating item recommendations for a user.

Rather than actually filtering out items from the re-ranked recommendations set, the system may present the entire recommendations set to the user in the re-ranked order. Because this set is typically large (e.g., several thousand items), the system's user interface may allow the user to page or scroll through this re-ranked recommendations set from highest to lowest ranking. Because users commonly do not take the time to scroll or page through the entire set of recommendations, the practical effect is the same as filtering, i.e., the user is only presented with those items falling near the top of the FIG. 2 illustrates an embodiment of a process 200 for generating item recommendations for a user. The process 200 is implemented in one embodiment by a probabilistic recommendation system, such as the probabilistic recommendation system 100 of FIG. 1.

The process 200 begins at 202 by retrieving the target user's relevant activity data or item collection. This step may be performed, for example, by the source selector 102 of FIG. 1. At 204, the process 202 selects a sample of sources from the activity data. This step may also be performed by the source selector 102. As mentioned above, at least a portion of the sources may be sampled probabilistically. Preferably, at least some of the sources are sampled according to a probability distribution (see FIG. 3, discussed below). In some embodiments, the source selector 102 may also assign weights to specific source items to cause more weight to be given to some source items than others; these weights may, for example, depend on the type of user action performed on the item, the user's rating (if any) of the item, and/or the amount of time since the user selected the item.

The process 200 then proceeds to identify similar (candidate) items corresponding to the sampled sources at 206. This step may be performed, e.g., by the candidate generator 106 of FIG. 1. In one embodiment, the process 200 obtains candidate items by accessing a similar items table or dataset, which identifies similarity scores between items. In one such embodiment, the process 200 analyzes similarities found in the table to develop candidate scores for the candidate items. Alternatively, the process 200 identifies the candidate items through traditional collaborative filtering, content-based filtering, or another type of recommendation algorithm.

In one embodiment, the step of identifying candidate items further includes discarding items having candidate scores below a threshold. By discarding candidate items below a particular threshold, weak candidates are weeded out. An example of using thresholds in this manner is described in more detail below with respect to FIG. 4.

Thereafter, the process 200 computes initial recommendation scores for the similar/candidate items at 208. This step may be performed, for example, by the probabilistic scorer 114 of FIG. 1. The initial recommendation scores according to one model represent the best theoretical scores for a given candidate item.

The initial recommendation scores of various embodiments are based on the number of reasons for recommending an item. Reasons in one embodiment include any event by the user (e.g., the purchase of a particular item) or set of events (e.g., the purchase of multiple items) that points to recommending an item in a given similarity pairing. Examples of using reasons to score recommendations are discussed below with respect to FIG. 3. In some implementations, the initial recommendation scores also depend on the "strengths" of the associated reasons, which in turn depend on the associated similarity scores.

After generating the initial recommendation scores, in one embodiment the process 200 generates adjusted scores at 210 by adding probabilistic noise to the initial recommendation scores and sampling. Adding probabilistic noise in one implementation includes providing a probability distribution based at least in part on the initial recommendation scores. Adjusted scores are generated in one embodiment by sampling values from the probability distribution. An example of one such probability distribution and related sampling operations are discussed below with respect to FIGS. 4 and 5. Advantageously, adding probabilistic noise to the initial recommendation scores enables at least some different recommendations to be made by successive recommendation generation events.

Finally, at 212, the process 200 selects a subset of the items based on the items' adjusted scores to present as recommendations to the user. This step may be performed by the candidate filter 114 described above, in the manner described above.

Figure 3:
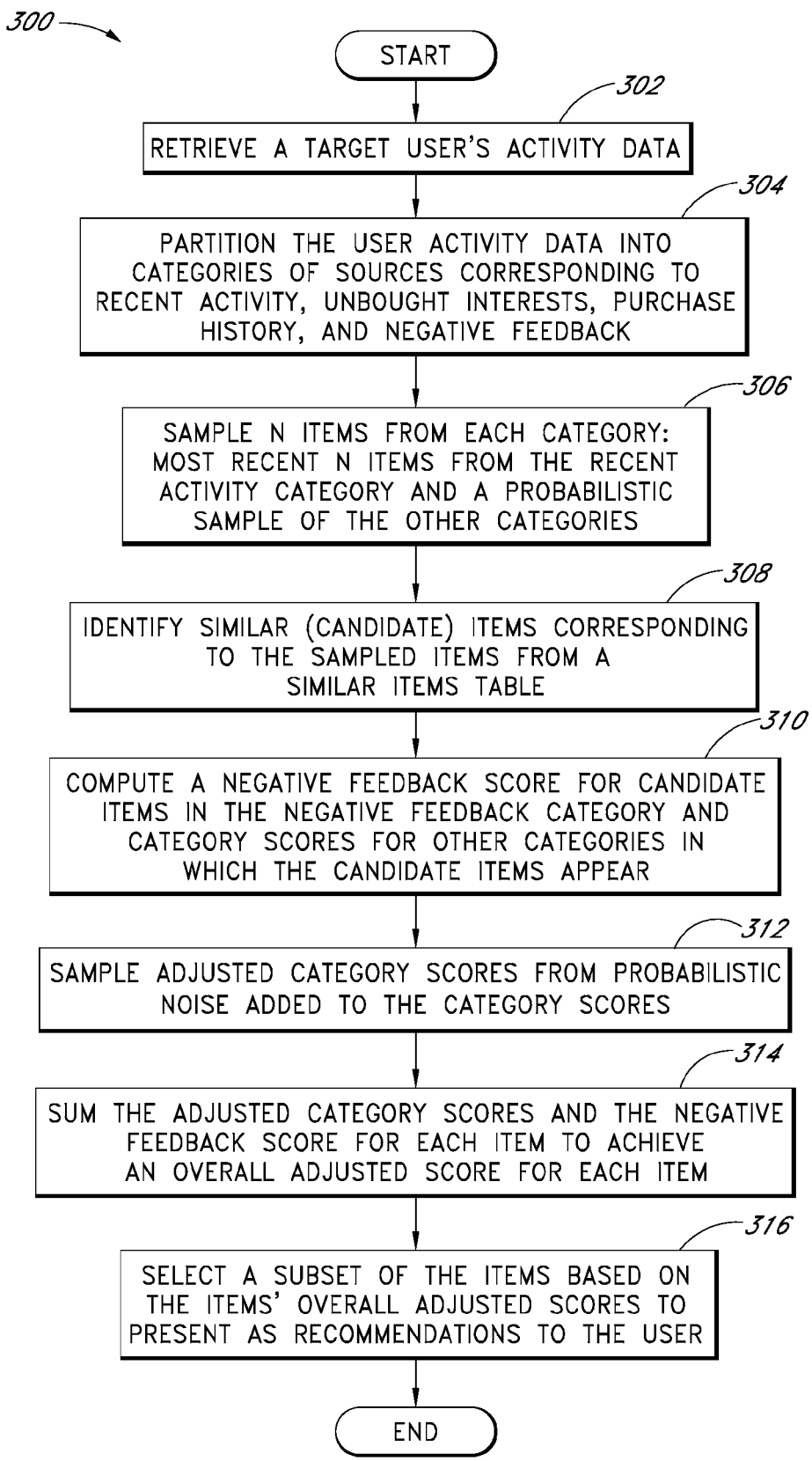
FIG. 3 illustrates another embodiment of a process for generating recommendations for a user.

FIG. 3 illustrates a more specific embodiment in which multiple categories of source items are used. The process 300 is implemented in one embodiment by a probabilistic recommendation system, such as the probabilistic recommendation system 100 of FIG. 1. The process 300 may be implemented in the context of a web-based electronic catalog system (see FIG. 7), and may be implemented in other contexts, such as in the contexts of electronic news or rental services.

The process 300 may be invoked in real-time in response to an online action of the user. For example, the user may specifically request recommendations. Alternatively, the process 300 may be invoked in response to an online action of the user that does not directly request the recommendations. For instance, the process 300 may be invoked when the user requests a web page that is configured to display personalized recommendations, possibly in combination with other content. Any of a variety of other methods can be used to initiate the recommendations generation process and to display or otherwise convey the recommendations to the user. For example, the recommendations can automatically be generated periodically and sent to the user by e-mail, in which case the e-mail listing may contain hyperlinks to the product information pages of the recommended items. Further, the personal recommendations could be generated in advance of any request or action by the user, and cached until requested.

At 302, the process 300 retrieves the target user's relevant activity data or item collection. This step, as well as the following two steps 304 and 306, may be performed by the source selector 102 of FIG. 1. In one embodiment, the user's activity data may include any of the data described above with respect to the process 200 (FIG. 2). The process 300 at 304 then partitions the user activity data or item collection into multiple categories of sources. This step also may be performed, for example, by the source selector 102 of FIG. 1. In the example embodiment shown, these categories include recent activity, unbought interests, purchase history, and negative feedback. Other categories may be chosen depending on the application.

Figure 6:
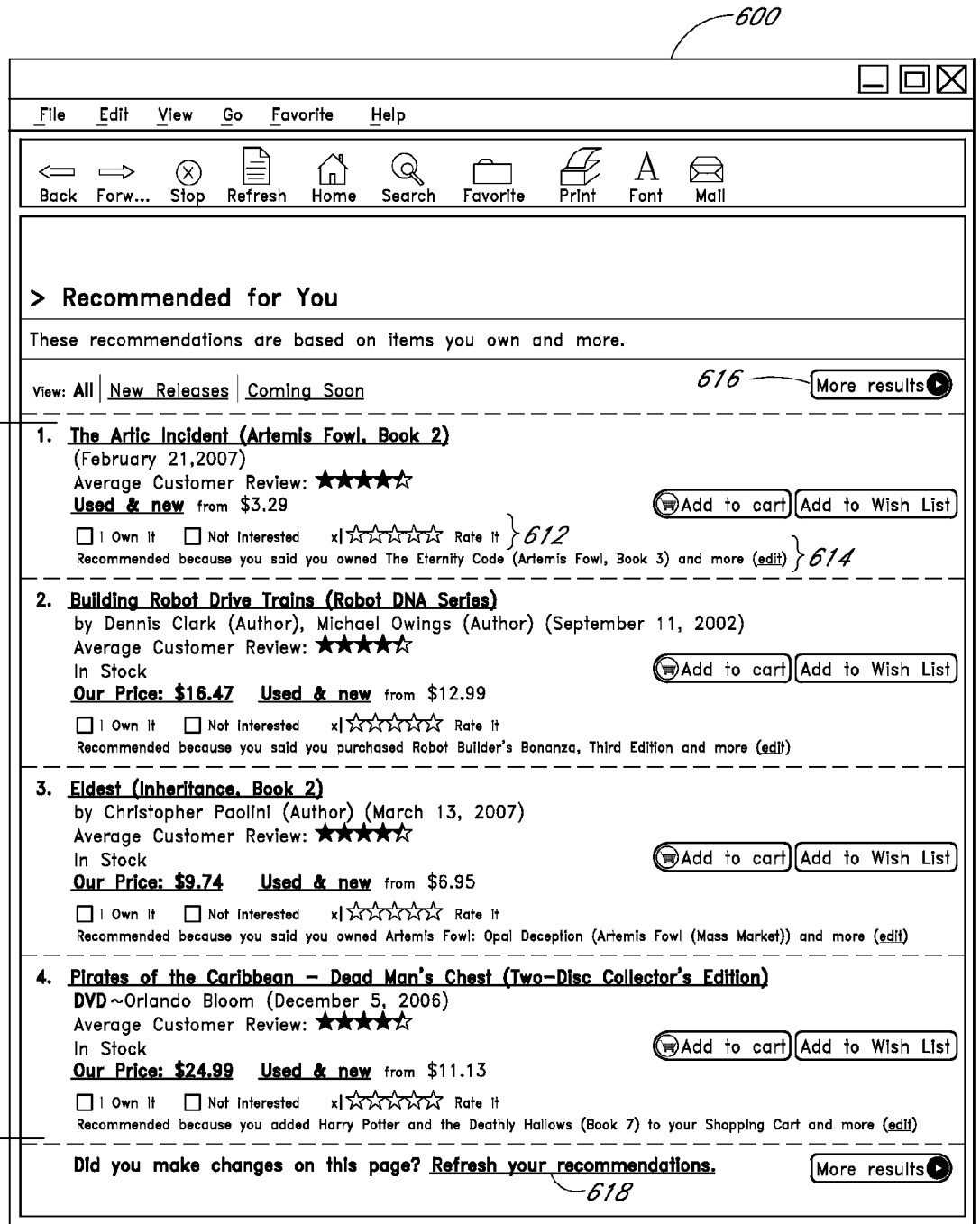
FIG. 6 illustrates a portion of a web page showing an example recommendation interface.

In one embodiment, the recent activity category includes or consists of items recently viewed and/or rated by the user, the unbought interests category consists of items in the user's wish list or shopping cart, the purchase history category consists of items purchased by the user, and the negative feedback category consists of items the user has explicitly rated poorly, such as by designating as "not interested" or by rating two stars or less on a scale of 1-5 stars (see FIG. 6). Other types of negative feedback, including implicit negative feedback, may be used to define the negative feedback category.

The example categories shown are used to categorize source items from which recommendations may be generated. More generally, in one embodiment, these categories are implemented as recommender components ("recommenders"). These recommenders include a purchase history recommender, an unbought interests recommender, a recent activity recommender, and a negative feedback recommender, among others. These separate recommenders may be implemented as software components or applications which each separately samples sources, generates similarities (candidate items) for those sources, and scores the candidate items. In one embodiment, these separate recommenders are also implemented with the same underlying logic of the candidate generator/recommendation engine 106.

Intuitively, the categories of recent activity, unbought interests, and purchase history indicate items which the user likes; hence, similar items may be good recommendations. Items in the negative feedback category reflect items which the user does not like. Items similar to those items in the negative feedback category may also be disliked by the user. Negative feedback may be used to improve the quality of recommendations to the user, as is described in further detail below.

At 306, the process 300 samples N items from each category, where N is an integer such as 64. This step may be performed, for example, by the source selector 102 of FIG. 1. In one embodiment, the N most recent items from the recent activity category are selected. The most recent items are selected as sources in certain embodiments because they may be a more accurate representation of the user's current interests than older activity, and therefore better recommendations may be generated therefrom. Some embodiments can use the user's past history in addition to or in place of the recent history, since the user may still be interested in items researched in the past.

Rather than take the N most recent items from the remaining categories, the process 300, in one embodiment, takes a probabilistic sample of items in these categories. Using a probabilistic sample beneficially adds "probabilistic noise" to the recommendation process 300.

In one embodiment, the process 300 samples the N items without replacement, e.g., by not sampling any member of the item population more than once. In addition, the process 300 of various embodiments samples the items according to a probability distribution. While the probability distribution may take many forms, in one embodiment, a uniform distribution is used for the negative feedback category. In other words, each item in the negative feedback category has an equally likely chance to be sampled. This example distribution assumes that the user dislikes each item in the negative feedback category equally as much. However, in alternative embodiments, different levels of negative feedback may be taken into account in the distribution. For example, items given a one star (worst) rating may be more likely to be selected than items given a higher rating.

For items in categories other than the recent activity category, the probability distribution in one implementation is dependent on age (as determined from event timestamps in the user's activity data), such that the likelihood of an item being selected decreases with age. Such a distribution can be used, for example, when it is believed that more recent items in the purchase history, unbought interests, and recent activity categories may more accurately reflect the user's current interests. However, older items may still be selected, enabling the recommendation process 300 to generate more varied recommendations. In one embodiment, the age-dependent probability distribution (or density/mass function) is equal or proportional to $1/\sqrt{age}$, where sqrt( ) is the square root of a number. The age may be given in hours, days, weeks, or some other unit of time.

At 308, the process 300 identifies similar items corresponding to the sampled sources in each category, such as by accessing item-to-item similarity mappings 108. As mentioned above, different types of similarity mappings or "similarities" may be used to generate similar items for different categories. For example, complementary similarities (e.g., purchase-based similarities) are used to generate similarities for items in the purchase history category, while substitution similarities (e.g., item-viewing-history-based similarities) are used to generate similarities for items in the other categories. Complementary similar items are items which complement each other, such as a digital media player and an accessory for the player. Substitution similar items are items which may be (subjectively or objectively) substituted for each other, such as different models of a digital media player. In some instances, a user may be more interested in complementary similarities for items which the user has already purchased; hence the use of complementary similarities in the purchase history category. In other categories, the user may be more interested in items which are similar to those items that the user has viewed but not purchased, and so substitution similarities are used. As will be recognized, various other types of similarity mappings, including content-based similarity mappings based on an automated analysis of item content, may additionally or alternatively be used.

At 310, the process computes negative feedback scores or values for items in the negative feedback category and category scores for each category in which items appear. This step may be performed by the probabilistic scorer 114 of FIG. 1. An item in the depicted embodiment that appears in all four categories, for example, would have a negative feedback score and three separate category scores. Certain items may have fewer than four scores. For instance, an item may not have a negative feedback score, or may have fewer than three category scores. In addition, certain items may have only a negative feedback score in some embodiments.

The negative feedback and category scores of certain embodiments can depend on the number of reasons for recommending an item (or for providing negative feedback on an item). The more reasons there are to recommend an item, the higher (or greater in magnitude, when negative scores are used) the items' negative feedback and/or category scores will tend to be, and vice versa. The negative feedback and category scores do not have to depend on reasons, however. These scores may instead (or additionally) depend on correlations between items or on some other mechanism.

Examples of reasons for recommending items follow. The iPod™ digital media player may be considered substitution similar to the Zune™ digital media player. If a user adds an iPod™ to his wish list, this wish list add is one reason to show the Zune™ to the user as a recommendation. Similarly, if the user also clicks on an iPod™ accessory that is considered similar (e.g., complementary similar) to the Zune™, this click is another reason to recommend the Zune™ to the user.

In another example, if users who dislike the iPod Nano™ also tend to dislike the iPod Shuffle™ digital media player (e.g., as indicated by a similarity table), giving a low rating to the iPod Nano™ may be a reason to include the iPod Shuffle™ in the negative feedback category. Many different types of reasons may be considered for each category, such as adding items to a shopping cart or wish list, viewing items, rating items, tagging items, deselecting items or categories in an existing recommendations list, deselecting items in a shopping cart or wish list, items that the customer has returned, and the like.

In alternative embodiments, the negative feedback and/or category scores do not depend on reasons, but instead depend on similarity (e.g., correlation) scores provided by a similar items table. The negative feedback and/or category scores may also depend on the similarity scores in addition to depending on reasons, such that the strength of a particular reason may be taken into account. For example, a similarity score for a particular similarity pairing may be used as a weight multiplied with a reason to generate a weighted negative feedback or category score.

The process 300 adds probabilistic noise to the category scores at 312. This step may also be performed by the probabilistic scorer 114 of FIG. 1. This step in one embodiment includes defining probability distributions that depend on the category scores. In one such embodiment, for each category score, a probability distribution is defined in which a parameter of the distribution depends on the category score. For example, the probability distribution may be a normal distribution with parameters mean ($\mu$) and standard deviation ($\sigma$). Other distributions may be chosen, such as the binomial distribution, Poisson distribution, or the like. In addition, parameters other than the mean and standard deviation may be used.

In one embodiment, because a particular category score depends on the number of reasons for recommending an item, the parameters of a probability distribution depend on the number of reasons. Thus, for example, the mean or standard deviation could equal the number of reasons or could be a function of the number of reasons. One example implementation of using probability distributions with reasons is described in further detail below, with respect to FIG. 4.

The process 300 samples adjusted category scores from the probabilistic noise added to the category scores at 314. In an embodiment, sampling the adjusted category scores includes probabilistically sampling values according to a probability distribution. Since the adjusted category scores are probabilistically sampled, the adjusted category scores may be worse than the theoretical best scores. Advantageously, probabilistic sampling facilitates providing different recommendations to users which are good, but perhaps not the best, recommendations.

The process 300 at 316 sums the adjusted category scores and the negative feedback score for each item to achieve an overall adjusted score for each item. In an embodiment, the sum of the adjusted category scores is indicative of the number of reasons for a particular product, adjusted with probabilistic noise. The negative feedback score in one embodiment is negative-valued, or rather is subtracted from the sum of the adjusted category scores. The negative feedback score therefore reduces the strength of the overall adjusted score, taking into account that even though there may be reasons for recommending an item, there may be reasons for not recommending an item. In various embodiments, the negative feedback reasons (and hence the negative feedback score) may outweigh the reasons for recommending an item (and hence the sum of the adjusted category scores), and vice versa.

Finally, at 318, the process 300 selects a subset of the items based on the items' overall adjusted scores to present as recommendations to the user. This step may be performed by the candidate filter 114 described above, in the manner described above.

Figure 4:
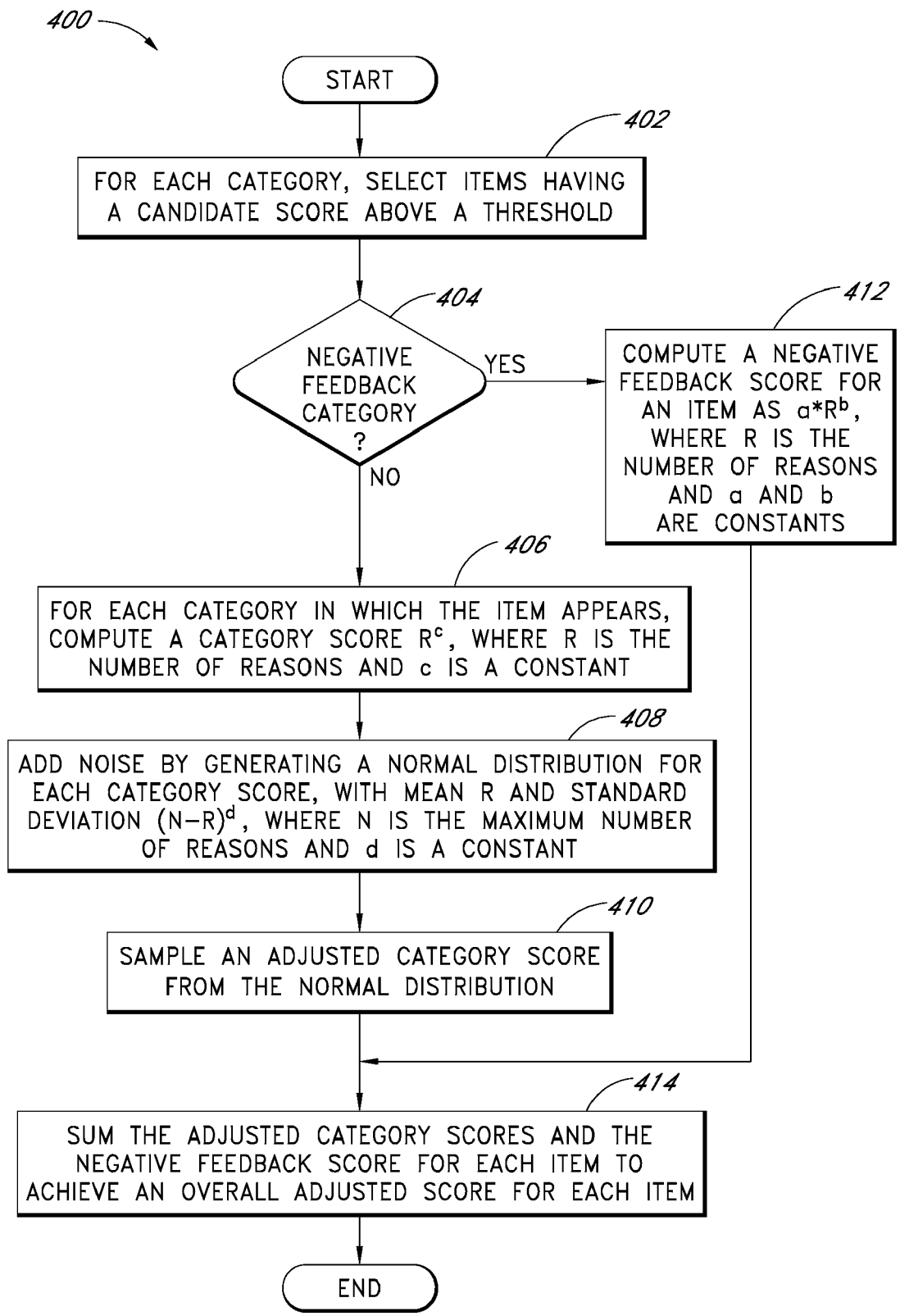
FIG. 4 illustrates an embodiment of a process for scoring items.

FIG. 4 illustrates an embodiment of a process 400 for scoring recommendations. The process 400 is implemented in one embodiment by one or more components of a probabilistic recommendation system, such as the probabilistic recommendation system 100 of FIG. 1. Likewise, the process 400 may be implemented as using one or more categories or recommenders, such as the recommenders described above, to generate scores. These categories (or recommenders) include purchase history, unbought interests, recent activity, and negative feedback. As described above, additional or fewer categories may also be used.

At 402, for each category, the process 400 selects candidate items having a candidate score above a threshold. This step may be implemented, for example, by the candidate generator 106, or alternatively, by the probabilistic scorer 114 of FIG. 1. In one embodiment, the threshold used for purchase history is lower than the threshold used for recent activity and unbought interests. In other words, more candidate items will be discarded in such embodiments in the categories of recent activity and unbought interests. This example embodiment assumes that candidate items in the purchase history are more relevant to a user than unbought items or items recently viewed, and this assumption may be different in different embodiments.

A threshold may also be applied to candidate items in the negative feedback category. This threshold in one embodiment is higher than the thresholds for the other categories, such that fewer negative feedback items are used than items in the other categories. The threshold for negative feedback may be adjusted to increase or decrease the amount of negative feedback provided. In one embodiment, the threshold is set high to provide a less-aggressive level of negative feedback.

At 404, the process 400 determines whether the negative feedback category is to be evaluated. Steps 404 and the remaining steps 406 through 414 may be implemented, for example, by the probabilistic scorer 114 of FIG. 1. If the negative feedback category is to be evaluated, the process proceeds to 512, where the process 400 computes a negative feedback score for an item as $$a*R^b \qquad (1)$$

where R is the number of reasons and a and b are constants. This expression (1) illustrates that the negative feedback score for an item is exponentially related to the number of reasons provided for that item. When b is greater than 1 (b>1), the value of (1) increases exponentially as R increases. The expression (1) models the assumption that the more reasons exist for a user to dislike an item, the more likely it is that the user will dislike similar items. In one embodiment, a is less than zero, so that when the adjusted category scores are added in step 414 below, the negative feedback score is effectively subtracted from the sum of the adjusted category scores. The constants a and b may be tuned to increase or decrease the effect of negative feedback on the overall adjusted score for an item.

For each other category in which the item appears, the process 400 at 406 computes a category score $$R^c \qquad (2)$$

where R is the number of reasons and c is a constant. Like the expression (1), the expression (2) generates category scores that are exponentially related to the number of reasons for recommending an item. In an embodiment, c is also greater than 1. In one specific example, c is 2.

The negative feedback and category scores computed by the expressions (1) and (2) in one embodiment are examples of initial recommendation scores. These scores in various embodiments represent the best theoretical scores for candidate items in a particular category. Thus, if the best theoretical overall score of a candidate item is desired, it can be computed from a sum of the initial recommendation scores.

In an embodiment, the negative feedback score computed by expression (1) is deterministic, e.g., not probabilistic. As a result, no probabilistic noise is added to the negative feedback score. Since negative feedback is sampled in certain embodiments according to a uniform distribution, where all items are assumed to be equally negative, no further probabilistic manipulation is done. However, in alternative embodiments, this score may also be computed probabilistically.

In contrast, the category scores computed by (2) are manipulated further to produce adjusted category scores, as follows. The process 400 adds noise at 408 by generating a normal distribution for each category score based on the number of reasons, where the normal distribution has mean $$\mu=R^c \qquad (3)$$

and standard deviation $$\sigma=(N-R)^d \qquad (4)$$

where N is the maximum number of reasons and d is a constant. The mean and the standard deviation are parameters of the normal distribution. In an embodiment, these parameters characterize the normal distribution. The characteristics of the normal distribution can therefore depend on the number of reasons R.

In the depicted embodiment, the mean is set to equal the category score for a particular category. Thus, as R increases, the mean increases. The standard deviation, on the other hand, is a function of the maximum number of reasons N minus the number of reasons R. Consequently, as R increases, the standard deviation decreases. In one embodiment, N is set to be the theoretical maximum number of possible reasons, for example, 60 reasons. The constant d may be adjusted to increase or decrease the rate at which the standard deviation increases or decreases. In an example embodiment, the value of d is 0.5.

Figure 5:
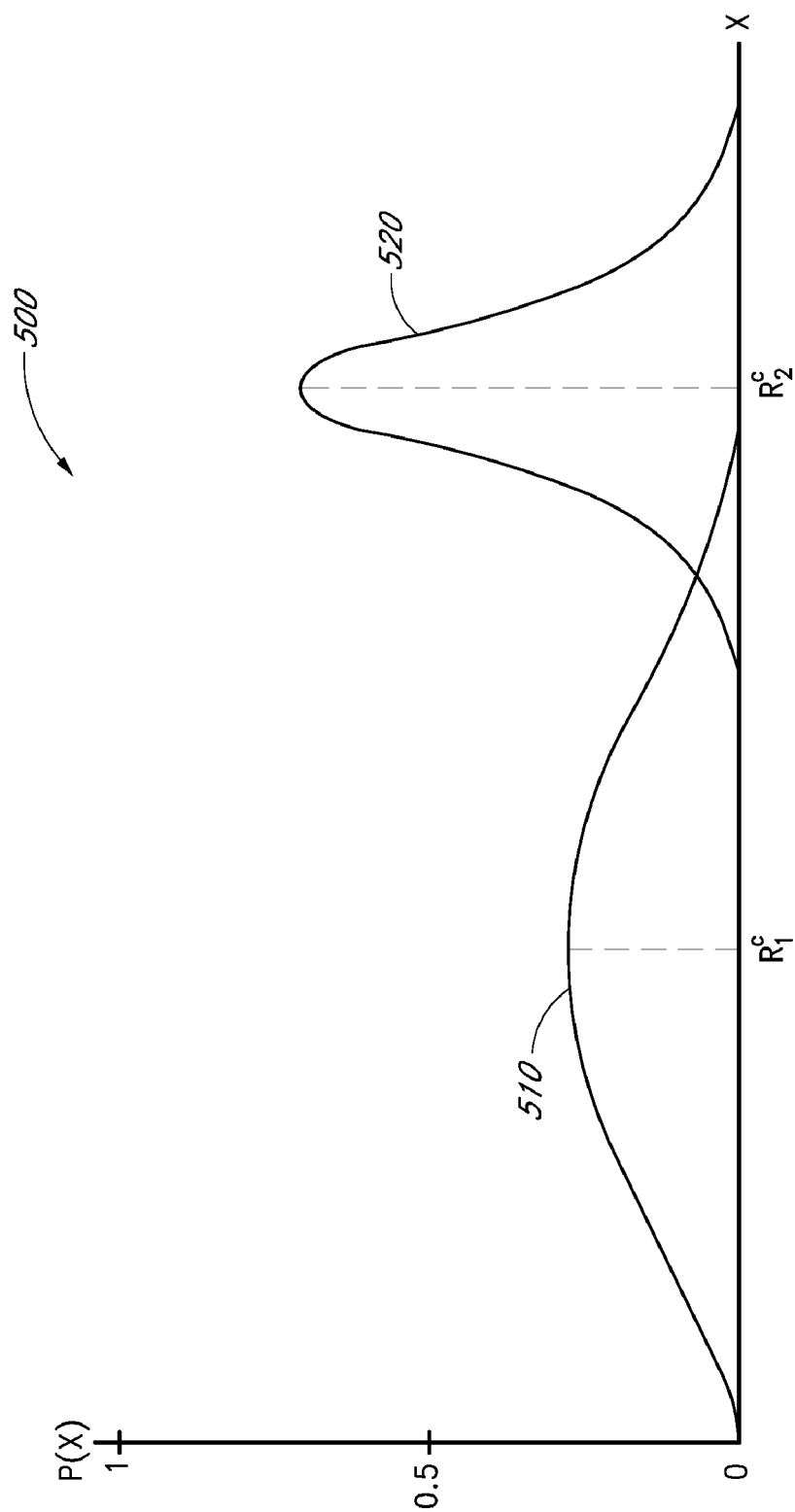
FIG. 5 illustrates example probability distributions of the type used with the process of FIG. 4.

Example normal distributions 510, 520 (e.g., probability density functions thereof) constructed according to the expressions (3) and (4) are illustrated in FIG. 5. For convenience, continuous normal distributions are shown graphed on an X axis versus a P(X) axis, where X is a random variable having real values and P(X) is the probability of X. In an alternative embodiment, a discrete normal distribution may be used instead.

The two example distributions 510, 520 shown have different characteristics. The distribution 510 has a mean value of $R_1^c$, and the distribution 520 has a mean value of $R_2^c$. The illustrated embodiment shows that $R_2^c$ is greater than $R_1^c$. In general, as the mean of a normal distribution increases, the distribution (or probability density function) is shifted to the right, and vice versa. Thus, the distribution 520 has a higher mean and is therefore farther to the right of the distribution 510. In addition, as the standard deviation increases, a normal distribution generally spreads out. The distribution 510 has a higher standard deviation and is therefore more spread out than the distribution 520.

Referring back to FIG. 4, the purpose of adjusting the characteristics shown in FIG. 5 will be described in the context of sampling. At 410, the process 400 samples a value from the normal distribution for each category except the negative feedback category. This value is determined to be the adjusted category score for the item, or in other embodiments, the adjusted category score is derived from this value. This value in one embodiment is a value from the X-axis shown in FIG. 5.

The narrower the particular normal distribution, the more likely it is that the sampled value will be closer to the mean. As the number of reasons increases, the standard deviation decreases and hence the normal distribution narrows. In addition, as the number of reasons increase, the mean increases and hence the distribution is shifted farther to the right. Since the mean is dependent on the number of reasons (e.g., the best theoretical score for a particular category), the higher this score, the more likely that the sampled value will be the best theoretical score for the particular category (or close thereto). Conversely, if there are fewer reasons for recommending an item, the distribution will be more spread out. The resulting sampled value or adjusted category score will be more likely to vary in such instances.

In one embodiment, the entropy of the distribution is a measure of how spread out the distribution is. The entropy for a normal distribution is $$\ln(\sigma*\text{sqrt}(2*pi*e)). \qquad (5)$$

Since the entropy of a distribution depends on the standard deviation (σ), the higher the standard deviation, the greater the entropy of the distribution. Said another way, the fewer reasons there are to recommend an item, the greater the entropy of the distribution will be, and there is a greater likelihood that the adjusted category score will be varied for that item.

In one implementation, the sampling operation at step 412 is performed by using a pseudo-random number generator (PRNG). The PRNG generates uniformly-distributed pseudo-random numbers. Thereafter, the output of the PRNG may be passed through an inverse cumulative distribution function for the normal distribution having a desired mean and standard deviation to generate the desired distribution. Alternatively, the output of the PRNG may be passed through a Box-Mueller or ziggurat transform to generate the normal distribution. Since the PRNG is a deterministic function, in this embodiment, sampling the probability distribution is not truly probabilistic. However, for the purposes of this disclosure, this sampling operation is considered probabilistic.

The PRNG of certain embodiments may also be used to generate recommendations statelessly. Stateless functionality may be achieved in one embodiment by seeding the PRNG with the same seed each time the list is generated. Since the output of a PRNG is deterministic, e.g., is predictable based on the seed value, probabilistic sampling done using the PRNG will also be deterministic. Probabilistic sampling therefore results in the same sampled values each time the list is generated with the same seed. In addition, a PRNG may be used similarly to implement the probabilistic sampling of the source selector described above. Thus, recommendations may not be changed until the seed of the PRNG is changed.

Various embodiments of the process 400 contemplate using this stateless property of the PRNG to adjust the amount of variation in a user's recommendation list to give a certain amount of overlap between new recommendation generation events. Adjusting this variation beneficially reduces potential user confusion, which might occur if the recommendations change rapidly. Adjusting the variation also reduces potential broken pagination problems, which may occur with lists spanning multiple web pages. For these lists, broken pagination can occur when a user sees recommendations from an earlier page on a subsequent page, due to the list regenerating on each page access. As described above, variation overlap may be implemented such that a set of recommendations does not change for a certain period of time (e.g., 24 hours) regardless of the number of recommendation list accesses by the user. After this period of time, a different seed is provided to the PRNG to generate new recommendations.

In one embodiment, the amount of variation in the recommendation list between new recommendation events is tuned by adjusting the variance of the normal distribution, which is the standard deviation squared ($\sigma^2$). For example, if the variance equals 0, there may be 100% overlap between visits. The constants c and d may be adjusted to increase the variance to create the desired overlap. One approach is to auto-parameterize the variance according to a specific user's frequency of return. Using the variance, a balance may be achieved between the number of identical recommendations over a period of time and the quality of recommendations. In one embodiment, for example, these parameters are adjusted to preferably create a 5 to 20% overlap between new recommendation generation events. More preferably, the parameters are adjusted to create a 10 to 15% overlap. Other ranges may be chosen in different embodiments.

Finally, the process 400 at 414 sums the adjusted category scores and the negative feedback score for each item to achieve an overall adjusted score for each item. The overall adjusted scores may be used to rank the items and choose items for recommendation. Thus, as a result of certain embodiments of the process 400, the items' rankings are probabilistically varied according to the number of reasons for recommending the item. More generally, the process 400 of certain embodiments probabilistically re-ranks items according to the category scores for the items.

FIG. 6 illustrates a portion of a web page showing an example recommendation interface. The example recommendations page 600 displays recommendations for a user. The recommendations page 600 comprises various details about the listed products 610 (four products shown), and includes buttons for adding each product to an electronic shopping cart or wish list. In this example, the recommendation page 600 also includes a set of controls 612, 614 for rating, indicating ownership of, and indicating a lack of interest in, each listed product 610. The recommendations service may use this information to improve the recommendations it makes. In an embodiment, this process is stateless, such that no information about which items have been recommended to which users needs be retained. A refresh option 618 allows a user to see an updated list of recommendations, which may be updated when the user adjusts the controls 612, 614.

Figure 7:
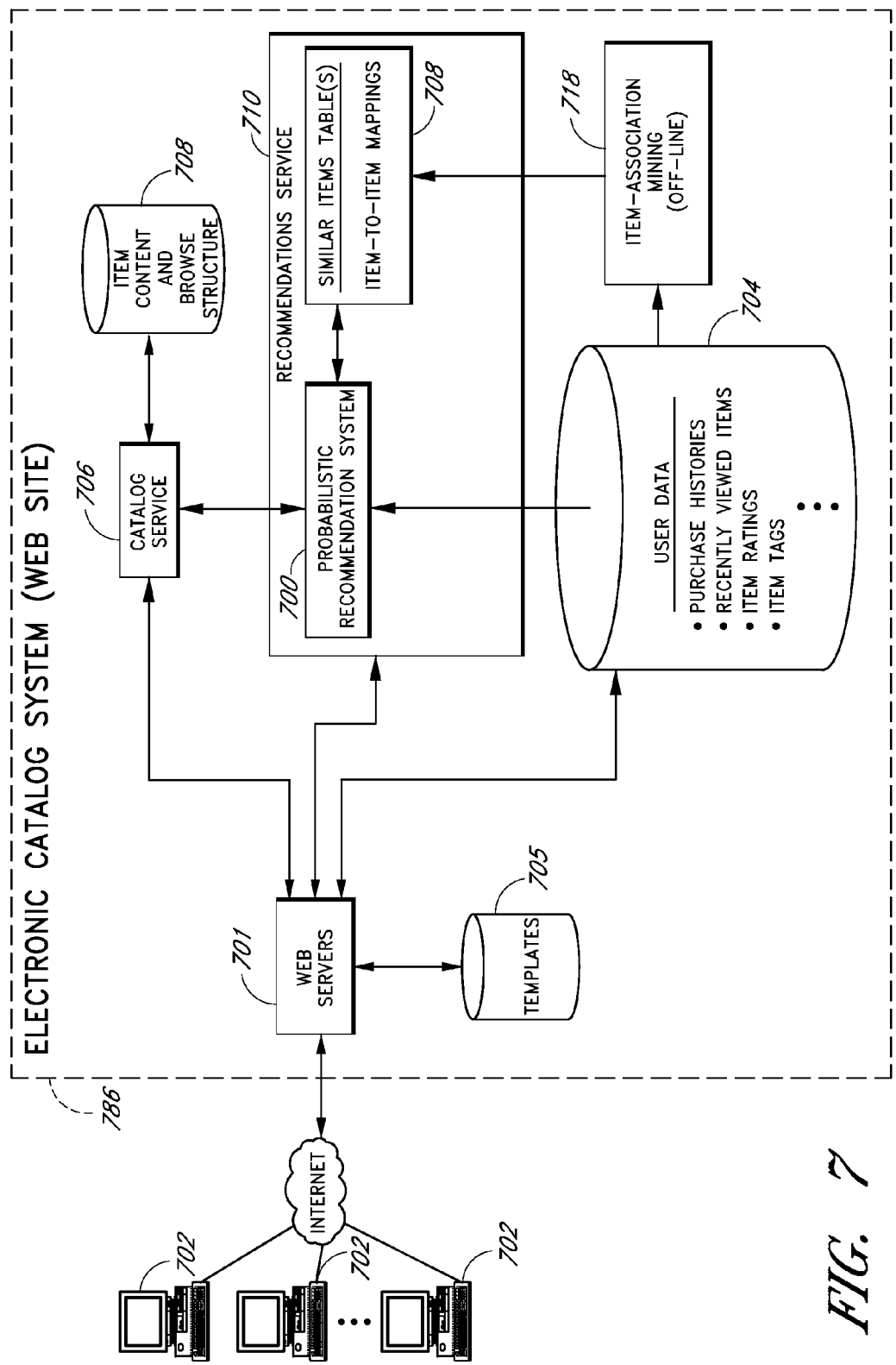
FIG. 7 illustrates one example of how the various recommendation features may be implemented in the context of a web-based electronic catalog system.

FIG. 7 illustrates how the various features described above may be implemented in the context of a web-based system that provides functionality for users to browse and purchase items from an electronic catalog. As will be recognized, the various features of the disclosed embodiments can also be implemented in other types of systems, including, e.g., music download systems that recommend music titles based on users' music download histories, video rental sites that recommend video/DVD titles based on users video rental histories, news sites that recommend news articles based on users' news browsing histories, browser toolbar based systems that recommend web sites and other network resources based on users' web browsing histories, web services for providing recommendations, checkout/wallet services that enable users to pay for goods from various participating merchants, and Internet advertising systems.

The system shown in FIG. 7 includes one or more web server machines 701 that generate and serve pages of a host web site in response to page requests from user computing devices 702. The web servers 701 provide user access to a catalog of items represented in a database 708 or collection of databases. The items preferably include or consist of items that may be purchased via the web site (e.g., book, music and video titles in physical or downloadable form; consumer electronics products; household appliances; magazine and other subscriptions, etc.). The database 708 also stores data regarding how the items are arranged within a hierarchical browse structure. Data regarding the catalog items and the browse structure is accessible via a catalog service 706, which may be implemented as a web service.

The system also includes a data repository 704 (e.g., one or more databases) that stores various types of user data, including identifiers of the items in each user's collection. For example, the data repository 704 may store users' purchase histories, item viewing histories, item ratings, and item tags. The purchase histories and item viewing histories may be stored as lists of item identifiers together with associated event timestamps. The various types of user data may be accessible to other components of the system via a data service (not shown), which may be implemented as a web service.

The system also includes a recommendation service 710 that generates recommendations in real time in response to requests from users. The recommendation service 710 includes a probabilistic recommendation system 700 that implements some or all of the probabilistic scoring features described herein. Separate executable components may optionally be provided for performing, e.g., source selection, candidate generation, probabilistic scoring, and candidate filtering; these components may all run on a single computer or on separate computers.

The probabilistic recommendation system 700 operates as described above with respect to FIGS. 1 through 5. More specifically, the recommendations service 710 may use one or more "similar items" tables/datasets 708 to look up items that are similar or related to the source items, together with associated data values indicating the strengths of such relationships. The similar items table(s) 708 may be generated offline by an item association mining component 718 that analyzes users' purchase histories, item viewing histories, or some other type of user activity data, and detects and quantifies behavior-based associations between specific items. For instance, if purchase histories are used, item A may be mapped to item B in a purchase-based similar items table 708 if a relatively large number of the users who purchased item A also purchased item B. Other types of recommendation engines, including recommendation engines that do not use item-to-item mappings, may also be used.

The electronic catalog system may also include services for handling various other types of tasks, such as user authentication, transaction processing, search query processing, storing user-assigned tags and ratings, processing of user-submitted sales listings, etc.

The web servers 701 use a data repository of web page templates 705 to dynamically generate web pages in response to browser requests. The templates directly or indirectly specify the service calls that are made to the services to, e.g., request data needed to generate the requested page. For instance, an appropriate template may be provided for generating recommendation pages of the type shown in FIG. 6, along with various other pages of the site.

When a user clicks on a link for viewing recommendations, a web server 701 requests recommendations for the user from the recommendations service 710. The recommendations service 710 then uses all or a portion of the user's activity data or collection (typically depending upon the context of the user's request) to generate the recommendations. As part of this process, the recommendations service 710 may use some or all of the candidate generation, probabilistic scoring, and candidate filtering operations described above. Regardless of which of these features is/are used, the resulting list of recommended items (or a portion of this list) is incorporated into the requested web page for transmission to the user's browser/computer 702.

The services and other application components 700, 706, 710, and 718 shown in FIG. 7 may be implemented in software code modules executed by any number of general purpose computers or processors, with different services optionally but not necessarily implemented on different machines interconnected by a network. The code modules may be stored in any type or types of computer storage, such as hard disk drives and solid state memory devices. The various data repositories 704, 705, 708 may similarly be implemented using any type of computer storage, and may be implemented using databases, flat files, or any other type of computer storage architecture.

Each of the processes and algorithms described above may be embodied in, and fully automated by, code modules executed by one or more computers or computer processors. The code modules may be stored on any type of computer-readable medium or computer storage device. The processes and algorithms may also be implemented partially or wholly in application-specific circuitry. The results of the disclosed processes and process steps may be stored, persistently or otherwise, in any type of computer storage, such as those mentioned above.

The various features and processes described above may be used independently of one another, or may be combined in various ways. All possible combinations are intended to fall within the scope of this disclosure.

Although this invention has been described in terms of certain preferred embodiments and applications, other embodiments and applications that are apparent to those of ordinary skill in the art, including embodiments and applications that do not provide all of the benefits described herein, are also within the scope of this invention. The scope of the invention is defined only by the claims, which are intended to be construed without reference to any definitions that may be explicitly or implicitly included in any of the incorporated-by-reference materials.

What is claimed is:

1. A computer-implemented method of selecting items to recommend, the method comprising:
    generating a ranked set of candidate items to recommend to a target user based at least partly on item selection actions performed by the target user, the ranked set of candidate items comprising candidate items and associated rankings of the candidate items;
    subsequent to said generating, probabilistically varying the rankings of at least some of the candidate items in the ranked set of candidate items automatically by a computer to generate a probabilistically-varied ranked set of candidate items,
    said probabilistically varying the rankings comprising using a pseudo-random number generator to vary the rankings by an amount that is based at least in part on a number of the item selection actions performed by the target user;
    selecting, from said probabilistically-varied ranked set, a first subset of the candidate items to present to the target user; and
    subsequent to said selecting, repeating at least said probabilistically varying the rankings and said selecting to thereby select a second subset of the candidate items to present to the target user, wherein the second subset of the candidate items comprises one or more items that are not members of the first subset of the candidate items.

2. The computer-implemented method of claim 1, wherein selecting, from said probabilistically-varied ranked set of candidate items, the first subset of the candidate items to present to the user comprises selecting a most-highly ranked subset of items.

3. The computer-implemented method of claim 1, wherein at least some of the candidate items are associated with one or more identified reasons for being recommended to the target user.

4. The computer-implemented method of claim 3, wherein the amount which the ranking of a candidate item is probabilistically varied further depends on the number of identified reasons for recommending the candidate item to the target user.

5. The computer-implemented method of claim 4, wherein probabilistically varying the rankings comprises causing candidate items having relatively low numbers of reasons to be probabilistically varied to a greater degree than candidate items having relatively high numbers of reasons.

6. The computer-implemented method of claim 1, wherein probabilistically varying the rankings comprises causing candidate items having relatively low category scores to be probabilistically varied to a greater degree than candidate items having relatively high category scores.

7. The computer-implemented method of claim 1, wherein probabilistically varying the rankings comprises generating values for at least a portion of the candidate items and adding probabilistic noise to the values.

8. The computer-implemented method of claim 7, wherein adding probabilistic noise to the values comprises generating a probability distribution corresponding to each value, wherein the characteristics of the probability distribution depend on the corresponding value.

9. The computer-implemented method of claim 8, further comprising sampling values from each probability distribution to generate a score for said at least a portion of the candidate items, wherein the score is responsive to the sampled value.

10. The computer-implemented method of claim 1, wherein probabilistically varying rankings of at least some of the candidate items in the ranked set further comprises probabilistically varying the rankings to achieve a target overlap value of same recommended items between the first and second subsets.

11. The computer-implemented method of claim 1, wherein said generating, said probabilistically varying, and said selecting are implemented by one or more machines.

12. A computer-implemented method of selecting items to recommend, the method comprising:
by a computer system comprising computer hardware:
identifying items selected from an electronic catalog by a target user;
for each of the identified items, selecting associated items from a table of associated items to produce a set of candidate recommendations, said selecting comprising providing an initial score for each candidate recommendation;
for each of the candidate recommendations,
identifying a number of the item selections made by the target user that resulted in the candidate recommendation being selected from the table of associated items, and
calculating a new score for the candidate recommendation using a value selected from a probability function, the probability function configured to provide the value based at least partly on the identified number of item selections, wherein the probability function at least uses a pseudo-random number generator to calculate the new score;
outputting a first subset of the candidate recommendations for presentation to the target user, each of the candidate recommendations being ranked in the output according to the new score for that candidate recommendation; and
subsequent to said outputting, repeating at least said calculating the new score for each of the candidate recommendations and said outputting to thereby output a second subset of the candidate recommendations, wherein the second subset of the candidate recommendations comprises at least some different items from the first subset of the candidate recommendations.

13. The computer-implemented method of claim 12, wherein the at least one characteristic of the probability function comprises entropy.

14. The computer-implemented method of claim 13, wherein the entropy of the probability function decreases as the number of reasons increases.

15. The computer-implemented method of claim 12, wherein the probability function is a normal distribution.

16. The computer-implemented method of claim 15, wherein the probability function is further configured to provide the value based at least partly on a mean configured to depend on the number of item selections.

17. The computer-implemented method of claim 15, wherein the probability function is further configured to provide the value based at least partly on a standard deviation configured to depend on the number of item selections.

18. The computer-implemented method of claim 12, wherein the new scores depend upon strength values associated with specific item selections.

19. The computer-implemented method of claim 12, wherein calculating the new score for the candidate recommendation further comprises assigning negative feedback score to the candidate recommendation, wherein the negative feedback score is dependent on the number of said item selections.

20. The computer-implemented method of claim 19, wherein calculating the new score for the candidate recommendation further comprises determining one or more category scores responsive to the number of item selections in one or more categories selected from the group of a purchase history category, an unbought interests category, and a recent activity category.

21. The computer-implemented method of claim 20, wherein calculating the new score for the candidate recommendation further comprises combining the one or more category scores and the negative feedback score.

22. The computer-implemented method of claim 12, wherein said identifying, said assigning, and said using are implemented automatically by one or more computer processors.

23. A recommendation engine for selecting items to recommend, the recommendation engine comprising:
a computer system comprising one or more processors, said computer system programmed to implement:
a candidate generator configured to:
generate a ranked set of candidate items to recommend to a target user, the ranked set of candidate items comprising candidate items and associated rankings of the candidate items;
a probabilistic scorer configured to, subsequent to the candidate generator generating the ranked set of candidate items, probabilistically vary the rankings of at least some of the candidate items in the ranked set of candidate items to generate a probabilistically-varied ranked set of candidate items, the probabilistic scorer configured to probabilistically vary the rankings by at least using a pseudo-random number generator to vary the rankings by an amount based at least in part on one or more item selection actions performed by the target user; and
a candidate filter configured to select, from said probabilistically-varied ranked set, a first subset of the candidate items to present to the user;
wherein the probabilistic scorer is further configured to probabilistically vary the rankings of at least some of the candidate items a second time to generate a second probabilistically-varied ranked set of candidate items, and wherein the candidate filter is further configured to select a second subset of the second probabilistically-varied ranked set of candidate items to present to the user, wherein the second subset comprises at least some different items from the first subset of the candidate items.

24. The recommendation engine of claim 23, wherein the degree to which the probabilistic scorer probabilistically varies the ranking of a candidate item depends on a number of identified reasons for recommending the candidate item to the target user.

25. The recommendation engine of claim 24, wherein probabilistically varying the rankings comprises causing candidate items having relatively low numbers of reasons to be probabilistically varied to a greater degree than candidate items having relatively high numbers of reasons.

26. A method for varying recommendations presented to users, the method comprising:
by a computer system comprising computer hardware:
selecting items as candidates for recommendation to a target user;
ranking the items using a recommendation process that depends at least in part on item selection actions performed by the target user, the rankings configured to estimate an optimal order for presenting the items as recommendations for the target user;
varying the rankings of the items to produce varied rankings by at least using a probabilistic function that depends at least in part on the item selection actions performed by the target user so as to estimate a less optimal order for presenting the items to the target user, the probabilistic function being implemented at least in part by a pseudo-random number generator, such that some of the rankings are increased for some of the items and other of the rankings are decreased for other of the items;
outputting a first subset of the items as a most highly-ranked subset of the items according to the varied rankings as additional recommendations for presentation to the target user; and
subsequent to said outputting, repeating said selecting, ranking, varying, and outputting, based on the same item selection actions performed by the target user, to thereby output a second subset of the items to recommend to the target user, the second subset of items comprising at least some different items from the first subset of items.

27. The method of claim 26, wherein said varying the rankings comprises adjusting the rankings based at least in part on a number of item selections performed by the target user.

28. The method of claim 27, wherein said varying the rankings comprises increasing ranking variability when the number of item selections is relatively higher and decreasing the ranking variability when the number of item selections is relatively lower.

* * * * *